A. G. WALKER.
TIRE.
APPLICATION FILED OCT. 24, 19
1,042,178.
Patented Oct. 22, 1912.
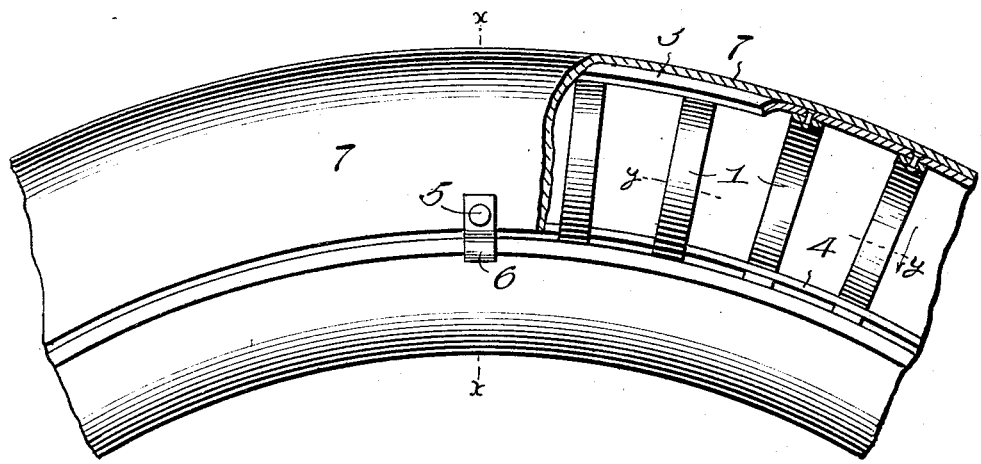
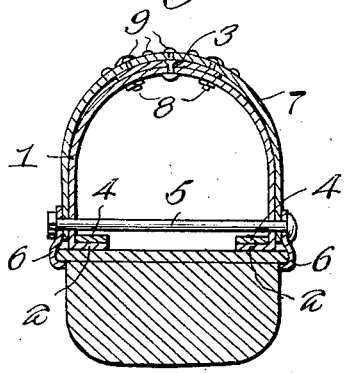
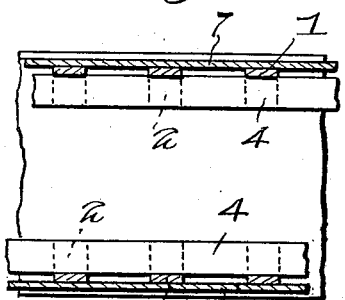
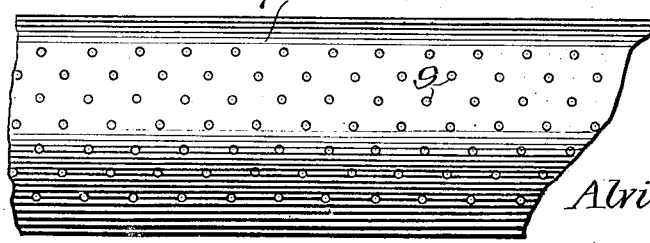
Witnesses:-
Hugh Ott
U. B. Hillyard,
Inventor;
Alvin G. Walker,
By Victor J. Evans,
Attorney

UNITED STATES PATENT OFFICE.

ALVIN G. WALKER, OF PACIFIC JUNCTION, IOWA.

TIRE.

1,042,178.　　　　Specification of Letters Patent.　　Patented Oct. 22, 1912.

Application filed October 24, 1911. Serial No. 656,395.

*To all whom it may concern:*

Be it known that I, ALVIN G. WALKER, a citizen of the United States, residing at Pacific Junction, in the county of Mills and State of Iowa, have invented new and useful Improvements in Tires, of which the following is a specification.

The present invention relates to tires intended chiefly for automobiles, the purpose being the provision of a yieldable tire which will possess in a degree all the advantages of a pneumatic tire yet be free from the disadvantages of punctures and blow-outs.

The invention contemplates a tire composed of spring elements so related as to provide a practically continuous tread to provide for ample play, thereby preventing interference between the elements incident to play as the parts of the tire are successively subjected to the stress of the load.

The invention consists of the novel features, details of construction and combination of parts, which hereinafter will be more particularly set forth, illustrated in the accompanying drawing, and pointed out in the appended claim.

Referring to the drawing, forming a part of the specification, Figure 1 is a side view of a portion of a tire embodying the invention, parts being in section. Fig. 2 is a sectional view on the line $x-x$ of Fig. 1. Fig. 3 is a sectional view on the line $y-y$ of Fig. 1. Fig. 4 is a detail view of part of the tread.

Corresponding and like parts are referred to in the following description, and indicated in all the views of the drawing, by the same reference characters.

The tire comprises a plurality of transversely arranged spring elements 1, each of the elements being of arch or bow form and having its end portions extending inwardly, as indicated at 2. Each of the elements 1 is formed of a strip of spring metal of suitable width, length and gage bent into the shape substantially as shown, the spring elements being arranged to encircle the rim of the wheel and spaced apart any desired distance. An outer ring 3 encircles the spring elements and is riveted or otherwise secured thereto. The ring 3 is outwardly curved between its edges to conform to the curvature of the spring elements 1. The ring 3 may be of any construction or material. Inner rings 4 engage the inwardly extending ends 2 of the spring elements 1 and serve to confine the same to the rim of the wheel to which the tire is fitted. Two rings 4 are provided for each tire and the rings are located at the sides of the tire. The rings 4 may be retained in place by any suitable means and as shown bolts 5 pass through openings formed in the ends of certain spring elements 1 and hooks 6 are located upon opposite end portions of the bolts 5 and engage the rings 4, thereby preventing outward displacement thereof. A sufficient number of bolts 5 is provided to insure a substantial and reliable structure, said bolts being arranged equidistant in the circumferential length of the tire.

The tire has a tread portion which encircles the ring 3, the tread portion 7 consisting of leather which fits snugly to the ring 3 and is secured thereto by suitable fastenings, such as bolts 8, the latter admitting of replacement of the tread when worn or when required for any cause. Rivets 9 stud the tread 7 and serve to resist wear and to prevent skidding. The rivets 9 are preferably of steel and project beyond the surface of the tread to form projections which engage the surface to prevent slipping or skidding.

From the foregoing description, taken in connection with the accompanying drawing, the advantages of the construction of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

In a vehicle wheel and in combination with the rim, a plurality of bow shaped springs having a transverse arrangement and spaced apart, said springs having their end portions bent inwardly and placed against the said rim, a metal ring encircling the bow shaped springs and attached thereto, other rings placed within the bow shaped springs and confining their bent ends to the rim of the wheel, a casing exterior to the bow shaped springs and the encircling ring, clips placed against the sides of the casing and the rim of the wheel, and transverse bolts connecting opposite clips and passing through openings in certain bow shaped springs.

In testimony whereof I affix my signature in presence of two witnesses.

ALVIN G. WALKER.

Witnesses:
PERCIVAL AMSDEN,
W. R. WALKER.

Copies of this patent may be obtained for five cents each, by addressing the "Commissioner of Patents, Washington, D. C."